(12) United States Patent
Suga

(10) Patent No.: US 8,134,755 B2
(45) Date of Patent: Mar. 13, 2012

(54) IMAGE READING APPARATUS

(75) Inventor: Takayuki Suga, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 981 days.

(21) Appl. No.: 11/942,192

(22) Filed: Nov. 19, 2007

(65) Prior Publication Data
US 2008/0117470 A1 May 22, 2008

(30) Foreign Application Priority Data
Nov. 20, 2006 (JP) ................................. 2006-312808

(51) Int. Cl.
H04N 1/04 (2006.01)

(52) U.S. Cl. ........ 358/474; 358/498; 358/475; 358/439; 399/85; 399/364; 381/313

(58) Field of Classification Search .................. 358/474, 358/498, 509, 475, 514, 513, 408, 1.13, 488, 358/506, 439; 399/45, 85, 364, 374, 367; 382/313
See application file for complete search history.

(56) References Cited

U.S. PATENT DOCUMENTS

| | | | | |
|---|---|---|---|---|
| 5,626,744 | A * | 5/1997 | Neuwirth | 210/97 |
| 5,665,490 | A * | 9/1997 | Takeuchi et al. | 429/314 |
| 5,666,490 | A * | 9/1997 | Gillings et al. | 709/238 |
| 5,832,137 | A * | 11/1998 | Knox | 382/275 |
| 6,459,823 | B2 * | 10/2002 | Altunbasak et al. | 382/299 |
| 6,563,606 | B1 * | 5/2003 | Yoshida | 358/439 |
| 6,590,704 | B1 | 7/2003 | Yano et al. | 359/466 |
| 6,721,074 | B1 * | 4/2004 | Kao | 358/496 |
| 6,894,263 | B2 * | 5/2005 | Fujibayashi et al. | 250/208.1 |
| 6,906,830 | B1 * | 6/2005 | Hayashi | 358/474 |
| 7,224,495 | B2 * | 5/2007 | Yui et al. | 358/474 |
| 7,248,378 | B2 * | 7/2007 | Shiraishi | 358/1.13 |
| 7,414,761 | B2 | 8/2008 | Tochigi et al. | 358/483 |
| 2001/0012132 | A1 * | 8/2001 | Kaji | 358/474 |
| 2004/0021913 | A1 * | 2/2004 | Aoyama et al. | 358/474 |
| 2004/0066544 | A1 | 4/2004 | Suga et al. | 358/509 |
| 2004/0165233 | A1 * | 8/2004 | Wang | 358/505 |
| 2005/0162712 | A1 * | 7/2005 | Shiraishi et al. | 358/474 |
| 2005/0200917 | A1 * | 9/2005 | Kanesaka et al. | 358/486 |
| 2006/0139700 | A1 * | 6/2006 | Murakami et al. | 358/474 |
| 2006/0197997 | A1 | 9/2006 | Oshida et al. | 358/498 |
| 2006/0227389 | A1 | 10/2006 | Yamamoto et al. | 358/496 |
| 2007/0188825 | A1 * | 8/2007 | Suga | 358/474 |
| 2007/0291333 | A1 * | 12/2007 | Suga et al. | 358/509 |
| 2008/0013133 | A1 * | 1/2008 | Taguchi | 358/514 |
| 2008/0100886 | A1 * | 5/2008 | Kobayashi | 358/498 |
| 2008/0158621 | A1 * | 7/2008 | Hamada et al. | 358/498 |

FOREIGN PATENT DOCUMENTS

| | | |
|---|---|---|
| JP | 5-37727 | 2/1993 |
| JP | 2000-201251 | 7/2000 |
| JP | 2002-335375 | 11/2002 |
| JP | 2002-359725 | 12/2002 |
| JP | 2005-331715 | 12/2005 |

* cited by examiner

Primary Examiner — Negussie Worku
(74) Attorney, Agent, or Firm — Fitzpatrick, Cella, Harper & Scinto

(57) ABSTRACT

An image reading apparatus according to an aspect of the invention includes a first reading unit which reads a surface of a document and a second reading unit which reads the other surface of the document. The first and second reading units include off-axial imaging units respectively. The off-axial imaging unit includes plural imaging mirrors in which off-axial reflecting surfaces having curvatures are formed. In the off-axial imaging unit, an incident direction and an outgoing direction of a reference axis light beam are different from each other. The off-axial imaging units are provided such that vertical directions of the first and second reading units become identical while an incident side of the light beam is located below an outgoing side with respect to the imaging unit.

18 Claims, 6 Drawing Sheets

IMAGE READING APPARATUS

BACKGROUND OF THE INVENTION

1. Field of the Invention

The present invention relates to an image reading apparatus, such as a copying machine, a scanner, and a facsimile, which can read surface and backside images of a document while conveying the document.

2. Description of the Related Art

Conventionally, in the image reading apparatus such as the copying machine, the scanner, and the facsimile, generally reflected light obtained in scanning a document surface with a scanning optical system including an exposure lamp and a folding mirror is imaged on a photoelectric conversion device through a lens, and the light is converted into an electric signal. Examples of the well-known document reading method include fixed scanning method of reading the document remaining stationary on a document base plate glass and a flow scanning method of reading the document which is being conveyed by an automatic document feeder (hereinafter referred to as ADF).

With reference to a method in which the document having images on both the surface and the backside is read by the flow scanning using ADF, there is a method in which one surface is read during a first conveyance using one reading unit and then the document is inverted through an inverting path provided in ADF to read the other surface. There is also a method of reading the document front side and the document backside during a one-time conveyance operation using two reading units for document front side and document backside. Recently, with a demand for enhancing a reading operation speed, frequently the two reading units are provided in the image reading apparatus. For example, the following techniques are disclosed for the image reading apparatus in which the two reading units are provided.

In a configuration disclosed in Japanese Patent Application Laid-Open No. 2000-201251, a reading unit having a reduction optical system in which an imaging lens is used is provided in a reader unit, and a contact image sensor (hereinafter referred to as CIS) in which an equal magnification optical system is used is provided in ADF. After the surface of the document conveyed by ADF is read by the reader unit, the backside is read by CIS provided in ADF.

In a configuration disclosed in Japanese Patent Application Laid-Open No. 5-37727, the reading unit having the reduction optical system in which the imaging lens is used is provided in the reader unit, and the reading unit having the reduction optical system in which the imaging lens is used is also provided in ADF. One surface of the document conveyed by ADF is read by the reading unit provided in reader unit, and the other surface is read by the reading unit provided in ADF.

In Japanese Patent Application Laid-Open No. 2002-335375, not the lens but an off-axial imaging optical system is used as the imaging optical system in the reading unit. The off-axial imaging optical system is an imaging optical system in which an imaging optical element including plural off-axial reflecting surfaces having curvatures is used. In the imaging optical system, an incident direction and an outgoing direction of a reference axis light beam are different from each other. Japanese Patent Application Laid-Open No. 2002-335375 also discloses a technique of using the reading unit in which the off-axial imaging unit having the off-axial imaging optical system is adopted.

However, in the configuration disclosed in Japanese Patent Application Laid-Open No. 2000-201251 in which the document front side is read by the reading unit having the reduction optical system while the document backside is read by CIS having the equal magnification optical system, a mismatch of color or resolution is possibly generated between reading images of the document front side and document backside due to a difference in optical system. That is, a difference in reading image between the document front side and the document backside is increased. Because different electric processes are performed to the surface and backside of the read document, two image processing circuits is required, which results in increased cost or upsizing of the apparatus.

On the other hand, in the configuration disclosed in Japanese Patent Application Laid-Open No. 5-37727 in which the reading unit having the reduction optical system is also provided in ADF to read the document backside, the problem described in Japanese Patent Application Laid-Open No. 2000-201251 is eliminated. However, in the reading unit having the reduction optical system disclosed in Japanese Patent Application Laid-Open No. 5-37727, because image deformation becomes prominent in off-axis when an angle of view of a lens is spread, it is necessary to lengthen an optical path, which results in a heavy and enlarged reading unit. Therefore, the whole apparatus also becomes enlarged and heavy, and it is not preferable that the reading unit having the reduction optical system in which the imaging lens is used be provided in ADF which is opened and closed with respect to the reader unit.

On the other hand, in the off-axial imaging optical system, because the generation of the image deformation in the off axis can be suppressed even if the optical path length is shortened, the downsizing and weight reduction can be achieved in the reading unit. Therefore, not only the off-axial imaging optical system is suitable to the reader unit, but also the off-axial imaging optical system is preferably provided in ADF which is opened and closed with respect to the reader unit. In order to decrease the difference in reading image between the document front side and document backside, preferably the off-axial imaging optical system is used in not only the reading unit for surface having the imaging optical system but also the reading unit for backside having the imaging optical system. For example, the reading unit in which the off-axial imaging unit is used is provided in ADF while the reading unit in which the off-axial imaging unit is used is provided in the reader unit, and thereby reading the document front side and document backside.

However, in this case, the off-axial imaging unit provided in ADF becomes upside down with respect to the off-axial imaging unit provided in the reader unit. That is, an incident side of a reference axis light beam is located below an outgoing side in the off-axial imaging unit provided in the reader unit, while the incident side of the light beam is located above the outgoing side in the off-axial imaging unit provided in ADF. In the off-axial imaging unit, because the imaging optical element including an off-axial reflecting surface is generally made of a resin material, the imaging optical element has low strength against an external force. When the imaging optical element becomes upside down to change a direction of gravity acting on the imaging optical element, the off-axial reflecting surface is deformed to change optical performance. Therefore, performances cannot be kept constant in the reading unit provided in ADF and the reading unit provided in the reader unit. This causes the difference in reading image between the document front side and the document backside to be increased.

The cost is increased when the strength of the off-axial imaging unit provided in ADF is increased with respect to the off-axial imaging unit provided in the reader unit in order to deal with the deformation of the off-axial reflecting surface due to the gravity.

In view of the foregoing, the invention is to prevent the change in imaging performance caused by the deformation of the off-axial reflecting surface due to the gravity while preventing the difference in reading image between the document front side and the document backside, when the off-axial imaging unit is used in the reading devices which read the document front side and the document backside respectively. The invention also prevents the deformation of the off-axial reflecting surface due to the gravity without increasing the coast.

SUMMARY OF THE INVENTION

In order to achieve the object, an image reading apparatus according to an aspect of the invention includes a first reading device which includes an imaging unit, the imaging unit imaging light reflected from an image surface of the document, the first reading device reading one surface of a document; and a second reading device which includes an imaging unit, the imaging unit imaging light reflected from an image surface of the document, the second reading device reading the other surface of the document, wherein the imaging units included in the first and second reading devices are off-axial imaging units including plural imaging mirrors, an incident direction and an outgoing direction of a reference axis light beam being different from each other, an off-axial reflecting surface having a curvature being formed in the imaging mirror, and the off-axial imaging units are provided such that vertical directions of the reading devices become identical while an incident side of the light beam is located below an outgoing side with respect to the imaging unit.

According to the invention, the off-axial imaging unit of the reading devices which read the document front side and the document backside are provided such that the vertical directions of the imaging devices become identical. Therefore, the change in imaging performance caused by the deformation of the off-axial reflecting surface due to the gravity can be prevented. Accordingly, the deformation of the off-axial reflecting surface due to the gravity is prevented without increasing the cost, and the imaging performance of each of the off-axial imaging units of the reading devices is substantially kept constant, so that the difference in reading image between the document front side and the document backside caused by the deformation of the off-axial reflecting surface can be decreased.

Further features of the present invention will become apparent from the following description of exemplary embodiments (with reference to the attached drawings).

BRIEF DESCRIPTION OF THE DRAWINGS

FIG. 2 is a sectional view showing schematic configurations of two reading units.

DESCRIPTION OF THE EMBODIMENTS

Exemplary embodiments of the invention will be described in detail with reference to the accompanying drawings. However, sizes, materials, and shapes of components described in the following embodiments and a relative arrangement among the components shall appropriately be changed depending on a configuration and various conditions of an apparatus to which the invention is applied. Accordingly, the invention is not limited to the sizes, materials, shapes, and relative arrangement of the embodiments unless otherwise noted.

First Embodiment

Figure 1:
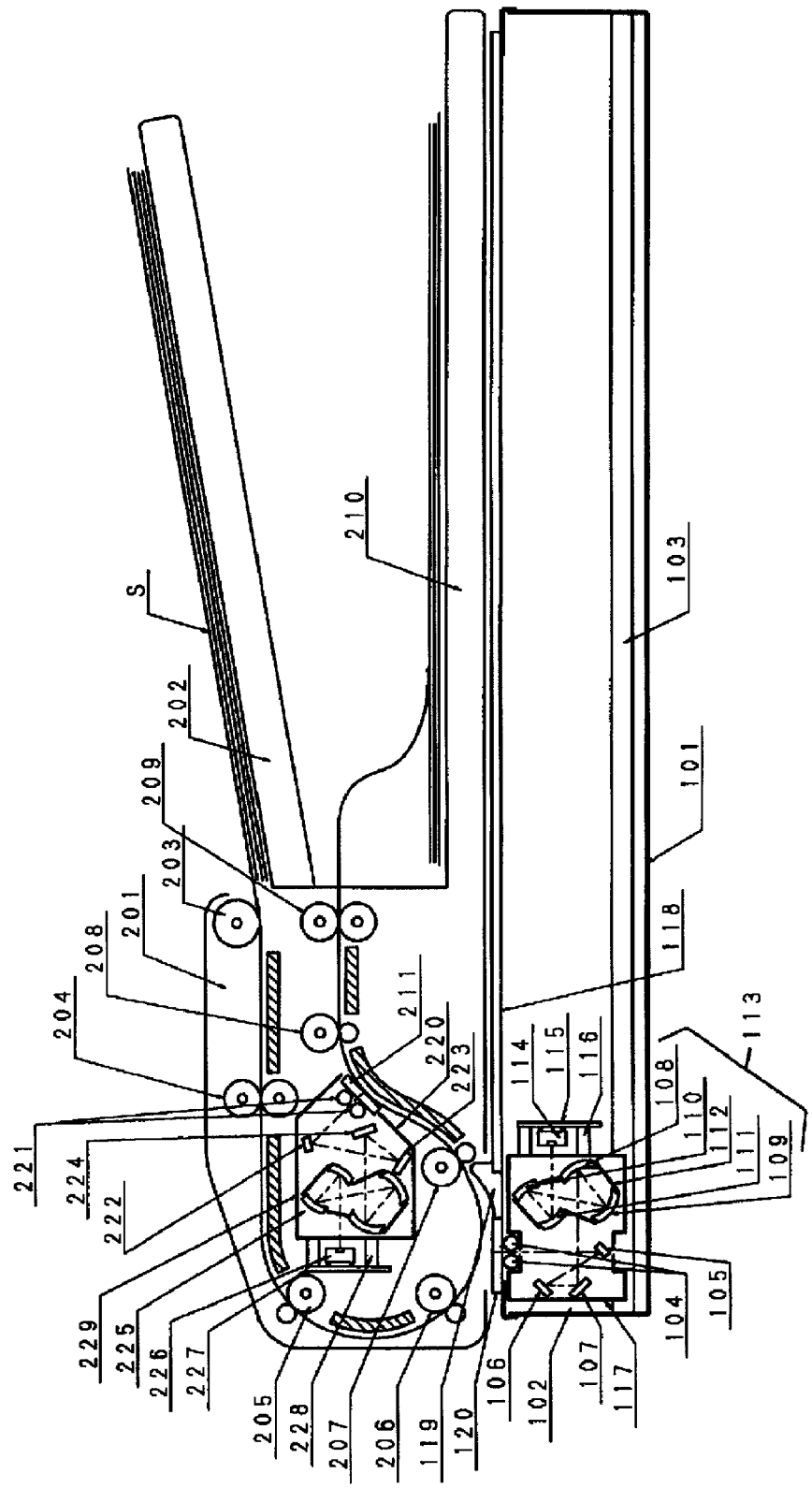
FIG. 1 is a sectional view showing a schematic configuration of an image forming apparatus according to a first embodiment of the invention.
Figure 2A:
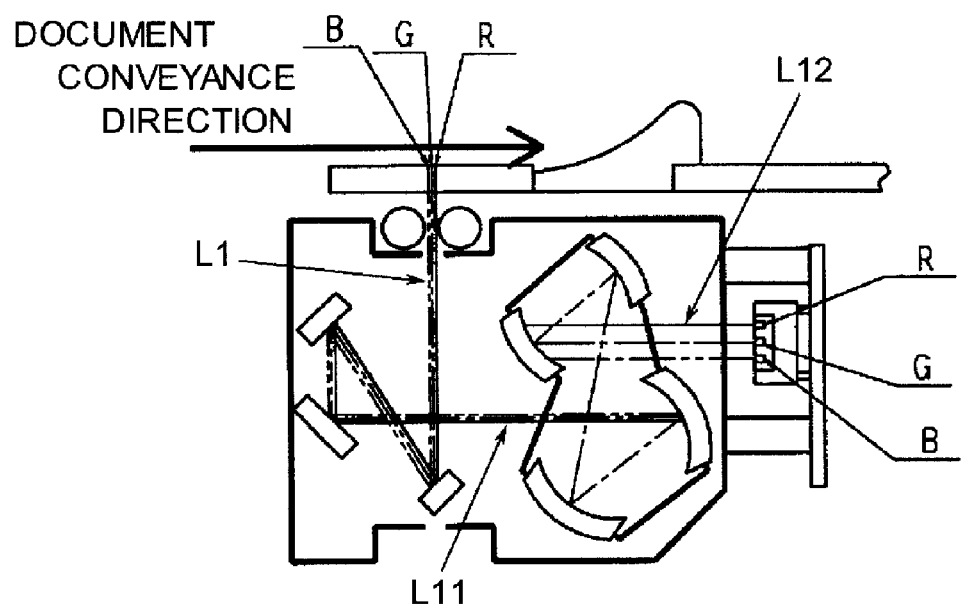
FIG. 2A shows a reading unit on a reader unit.
Figure 2B:
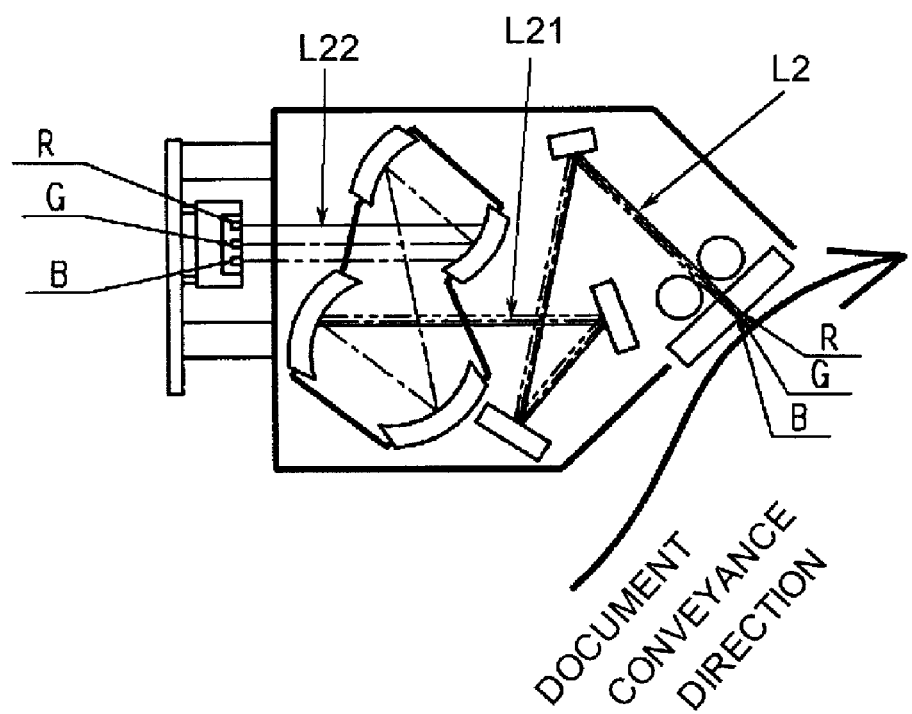
FIG. 2B shows a reading unit on a document conveyance unit side.

An image reading apparatus according to a first embodiment of the invention will be described with reference to FIGS. 1 and 2. FIG. 1 is a sectional view showing a schematic configuration of an image forming apparatus of the first embodiment. FIG. 2 is a sectional view showing schematic configurations of two reading units, FIG. 2A shows a reading unit on a reader unit, and FIG. 2B shows a reading unit on a document conveyance unit side.

(Image Reading Apparatus)

The schematic configuration of the image reading apparatus will be described with reference to FIG. 1. The image reading apparatus includes a reader unit 101 which is of the first unit and a document conveyance unit 201 which is of the second unit being openable with respect to the reader unit 101.

(Reader Unit)

Referring to FIG. 1, the reader unit 101 includes a first reading unit 102. The first reading unit 102 is of the first reading device which reads one surface (in this case, document front side) of the document. The first reading unit 102 can read a document image placed on a document base plate glass while moved along the document surface (document surface is scanned). A guide shaft 103 guides the first reading unit 102 when the first reading unit 102 scans the document front side in a horizontal direction of FIG. 1.

The first reading unit 102 includes a light source 104, reflecting mirrors 105 to 107, a first imaging unit 113, CCD 114, a signal processing board 115, a coupling member 116, and a reading unit frame 117 which retains the components.

The document is irradiated with the light source 104. The reflecting mirrors 105 to 107 guide the light diffused on the document surface. The first imaging unit 113 which is of the off-axial imaging unit including imaging mirrors 108 to 111 and a mirror retaining member 112. The imaging mirrors 108 to 111 images the light guided by the reflecting mirrors 105 to 107. In the imaging mirrors 108 to 111, an incident direction differs from an outgoing direction of a reference axis light beam. The imaging mirrors 108 to 111 include off-axial reflecting surfaces having curvatures. The mirror retaining member 112 retains the imaging mirrors 108 to 111 at predetermined relative positions. CCD 114 is of the photoelectric conversion device which photoelectric conversion is performed to the light imaged by the imaging unit 113. The signal processing board 115 drives CCD and performs signal processing. The coupling member 116 couples CCD and the signal processing board to the reading unit frame 117. The reading unit frame 117 is of the reading device frame which integrally retains the light source 104, the reflecting mirrors 105 to 107, the first imaging unit 113, CCD 114, and the signal processing board 115.

The document is placed on a document base plate glass 118. A surface flow scanning glass 120 is used to read the document when the document is conveyed by a document conveyance unit which is of the automatic document feeder. A jump platform 119 scrapes the document conveyed by the document conveyance unit. The first reading unit 102 is scanning-moved along the document surface to read the document image placed on the document base plate glass 118.

In reading the document image, the light source 104 irradiates the image surface of the document, the light diffused on the document surface is guided by the reflecting mirrors 105, 106, and 107, and the light is imaged onto CCD 114 by the imaging mirrors 108, 109, 110, and 111. CCD 114 performs the photoelectric conversion of the imaged light into an electric signal, and the signal processing board 115 performs processing to the obtained electric signal, which allows the document image to be read as the electric signal.

As shown in FIG. 2A, the imaging unit 113 of the first reading unit 102 is provided such that an incident side L11 of a reference axis light beam L1 for the imaging unit 113 is located below an outgoing side L12.

(Document Conveyance Unit)

Referring to FIG. 1, the document conveyance unit 201 includes a sheet tray 202, a sheet feed roller 203, a separation roller 204, conveyance rollers 205 to 208, a discharge roller 209, and discharge tray 210. Documents S are stacked on the sheet tray 202. The sheet feed roller 203 feeds the document on the sheet tray 202. The separation roller 204 separates a bundle of sheets one by one. The conveyance rollers 205 to 208 are of the document feeding device which conveys the document in the document conveyance unit. The discharge roller 209 discharges the conveyed document. The discharge tray 210 stacks the documents discharged by the discharge roller 209.

A backside flow scanning glass is used to read the conveyed document.

The second reading unit 220 is of the second reading device which reads the other surface (in this case, document backside) of the document. As with the first reading unit 102, the second reading unit 220 includes a light source 221 which irradiates the document and reflecting mirrors 222 to 224 which guides the light diffused on the document surface. The second reading unit 220 also includes a second imaging unit 225 which is of the off-axial imaging unit. The off-axial imaging unit includes an imaging mirror having an off-axial reflecting surface and a mirror retaining member which retains the imaging mirror. The second reading unit 220 also includes CCD 226 and a signal processing board 227. CCD 226 is of the photoelectric conversion device which performs the photoelectric conversion of the light imaged by the imaging unit 225. The signal processing board 227 drives CCS 226 and performs the signal processing. The second reading unit 220 also includes a reading unit frame 229 which is of the reading device frame. The reading unit frame 229 integrally retains the light source 221, the reflecting mirrors 222 to 224, the second imaging unit 225, CCD 226, and the signal processing board 227. The second reading unit 220 also includes a coupling member 228 which couples CCD and the signal processing board to the reading unit frame 229.

As shown in FIG. 2B, the imaging unit 225 of the second reading unit 220 is provided such that an incident side L21 of a reference axis light beam L2 for the imaging unit 225 is located below an outgoing side L22. That is, in the reading units 102 and 220, the imaging units 113 and 225 are provided such that vertical directions of the imaging units 113 and 225 become identical.

In the reading units 102 and 220, the first and second imaging units 113 and 225 are provided such that incident and outgoing directions of the light beam with respect to each imaging unit are reversed to each other in the horizontal direction.

The second reading unit 220 is provided between the conveyance rollers 207 and 208 in the document conveyance unit. The first reading unit 102 is provided in the reader unit while being able to scan the document. During flow scanning, the first reading unit 102 is stopped between the conveyance rollers 206 and 207. Because the first and second reading units are provided between the conveyance rollers, the document can be read while nipped between the conveyance rollers during the flow scanning. Therefore, the deterioration of the read image, caused by a fluctuation in document conveyance speed or vibration of the document in the conveyance path, can be prevented.

The document image reading operation performed by the second reading unit 220 is similar to that performed by the first reading unit 102. That is, in reading the document image, the light source 221 irradiates the image surface of the document, the light diffused on the document surface is guided by the reflecting mirrors 222 to 224, and the light is imaged on the CCD 226 by the imaging mirror. CCD 226 performs the photoelectric conversion of the imaged light into the electric signal, and the signal processing board 227 performs processing to the obtained electric signal, which allows the document image to be read as the electric signal.

(Image Reading Operation)

The document reading operation with the image reading apparatus having the above configuration will be described below.

The documents S placed on the sheet tray 202 are delivered into the document conveyance unit 201 by the sheet feeding roller 203, the documents S are separated one by one by the separation roller 204, and the document S is conveyed onto the surface flow scanning glass 120 by the conveyance rollers 205 and 206. The first reading unit 102 reads the document front side in the course of conveying the document S onto the surface flow scanning glass 120. The document S whose surface is read is scraped by the jump platform 119, the document S is conveyed through the backside reading glass 211 by the conveyance rollers 207 and 208, and the document S is discharged onto the discharge tray 210 by the discharge roller 209. The second reading unit 220 reads the document backside in the course of passing by the backside reading glass 211.

As described above, according to the first embodiment, the imaging units 113 and 225 of the reading units 102 and 220 are provided such that the vertical directions of the imaging units 113 and 225 become identical. That is, the imaging units 113 and 225 are provided such that the vertical directions of the imaging units 113 and 225 become identical while the incident side of the light beam to the imaging unit is located below the outgoing side. Therefore, the directions of the gravity acting on the imaging units 113 and 225 provided in the reader unit 101 and document conveyance unit 201 can be caused to coincide with each other. On this account image magnification, focal depth and an image formation location change by the effect of the gravity, but these change in the same way at the front side and the back side. Accordingly, the difference in reading image between the document front side and the document backside caused by the deformation of the off-axial reflecting surface can be decreased.

In the reader units 101 and 201, each of the imaging units 113 and 225 is provided such that the incident and outgoing directions of the light beam with respect to each imaging unit are reversed to each other in the horizontal direction, which allows the orientations of imaging units 113 and 225 with respect to the document conveyance direction to be caused to coincide with each other in the reader unit 101 and the document conveyance unit 201. Therefore, as shown in FIG. 2, the reader unit is identical to the document conveyance unit in the plural-line reading order when the document is imaged on CCD having the plural lines (for example, RGB three-color lines) by the off-axial imaging unit. Accordingly, the difference in image between the document front side and the document backside can further be decreased without reversely attaching CCDs to reader unit and the document conveyance unit or performing the electric processing.

The off-axial imaging unit is used in both the reader unit and the document conveyance unit, which allows the document front side and the document backside to be read by the same optical system. There is no difference in imaging performance between the two reading units, the depth of field can ensured, and color shift is not generated in the main scanning because the document is not imaged with the lens. Therefore, the duplex of the document can be read with high accuracy. The need of providing the plural image processing circuits is eliminated, so that the cost reduction and downsizing of the apparatus can be achieved.

Figure 3:
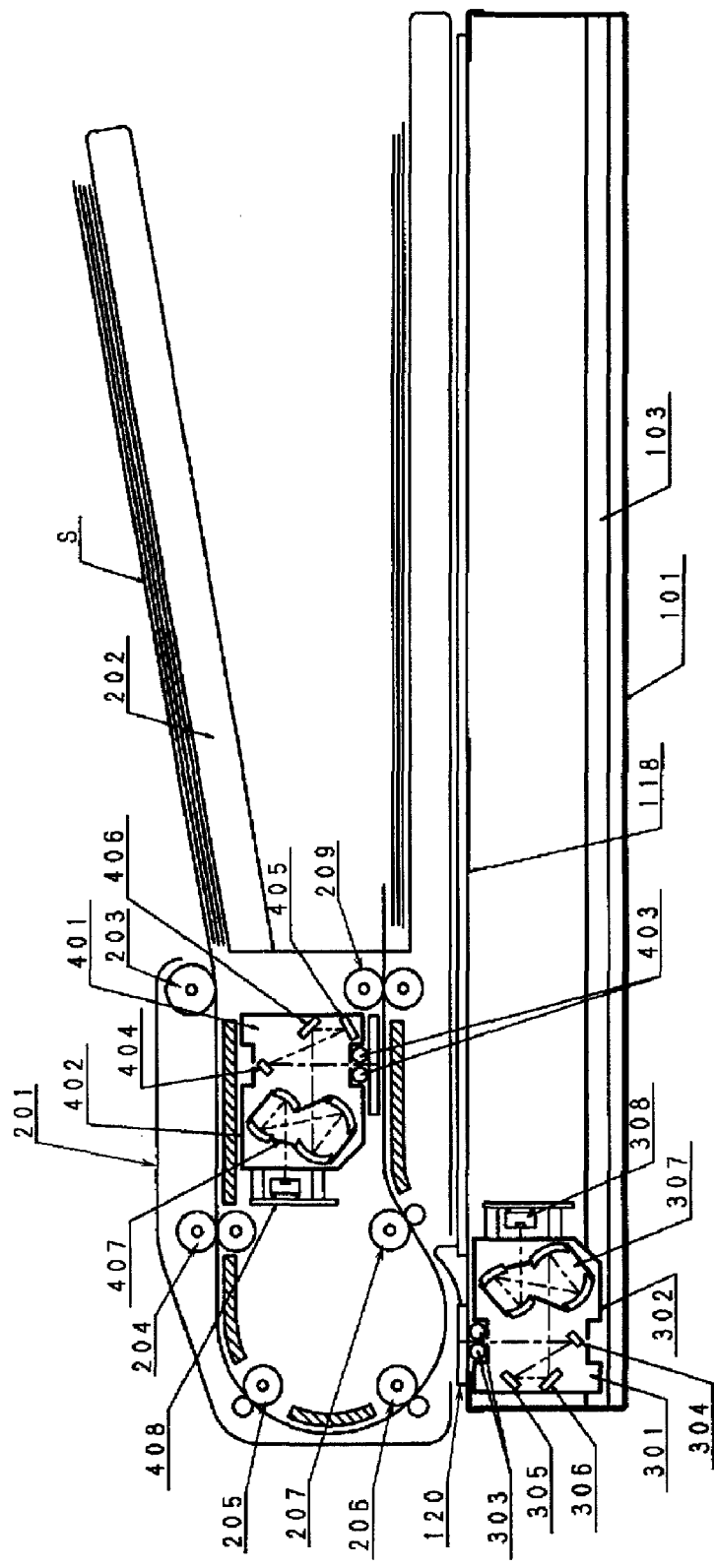
FIG. 3 is a sectional view showing a schematic configuration of an image forming apparatus according to a second embodiment of the invention.

Additionally, in the off-axial imaging unit, generation of the off-axial image deformation can be suppressed even if the optical path length is shortened. Therefore, the cost reduction and downsizing of the apparatus can be achieved, and advantageously the downsizing and improved operability of the opening and closing operation are achieved in the document conveyance unit which is opened with respect to the reader unit and Second Embodiment FIG. 3 is a sectional view showing a schematic configuration of an image forming apparatus according to a second embodiment of the invention. In the second embodiment, the same reading unit frame is used in both the first reading unit of the reader unit and the second reading unit of the document conveyance unit. Because other configurations are similar to those of the first embodiment, the detailed description is neglected. The same component as the first embodiment is designated by the same numeral.

Referring to FIG. 3, a first reading unit 301 and a first reading unit frame 302 are provided in the reader unit 101. The first reading unit frame 302 integrally retains a light source 303 which irradiates the document, reflecting mirrors 304, 305, and 306 which form the optical path, a first imaging unit 307 which images the light guided by the reflecting mirrors, and CCD 308 which performs the photoelectric conversion of the imaged light.

A second reading unit 401 and a second reading unit frame 402 are provided in the document conveyance unit 201. The second reading unit frame 402 integrally retains a light source 403 which irradiates the document, reflecting mirrors 404, 405, and 406 which form the optical path, a second imaging unit 407 which images the light guided by the reflecting mirrors, and CCD 408 which performs the photoelectric conversion of the imaged light.

The first and second reading unit frames 302 and 402 are the same component. Therefore, in the case where the first and second reading unit frames 302 and 402 are provided in either reader unit or the document conveyance unit, the light sources 303 and 403, the reflecting mirrors 304 to 306 and 404 to 406, and the imaging units 307 and 407 can be disposed respectively. Particularly, the first and second imaging units 307 and 407 are disposed such that the vertical directions of the first and second imaging units 307 and 407 become substantially identical.

According to the configuration of the second embodiment, as with the first embodiment, the imaging performance of each of the off-axial imaging units can substantially be kept constant in the reader unit and the document conveyance unit, so that the difference in image between the document front side and the document backside can further be decreased. Because the common component can be used in the first reading unit and the second reading unit, the number of components can be decreased to achieve the cost reduction.

Third Embodiment

Figure 4:
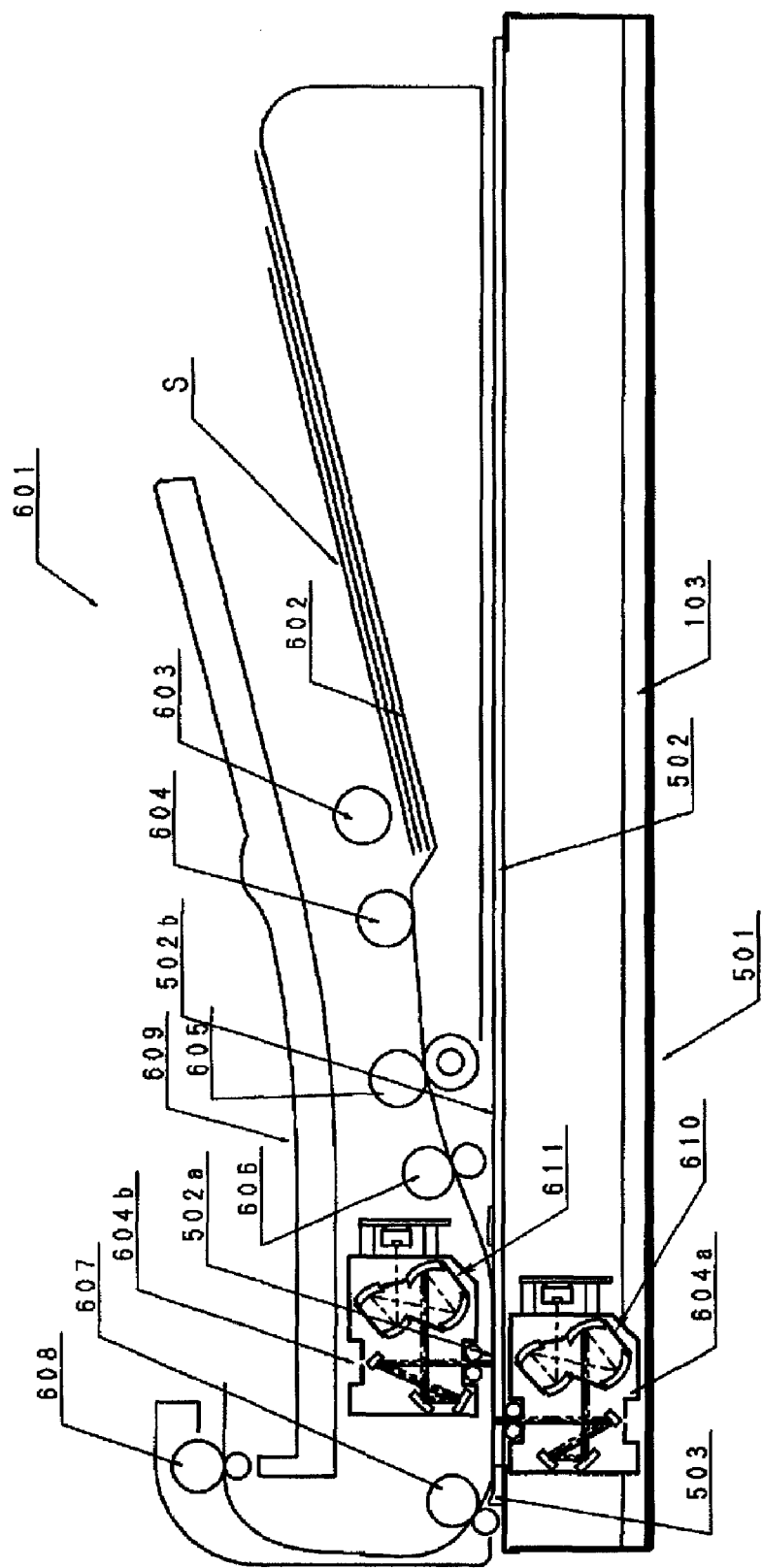
FIG. 4 is a sectional view showing a schematic configuration of an image forming apparatus according to a third embodiment of the invention.

FIG. 4 is a sectional view showing a schematic configuration of an image forming apparatus according to a third embodiment of the invention. In the third embodiment, the same reading unit frame is used in both the first reading unit of the reader unit and the second reading unit of the document conveyance unit. Furthermore, the imaging units of the reading units are provided such that the incident and outgoing directions of the light beam with respect to each imaging unit are orientated toward the same direction in the horizontal direction.

Referring to FIG. 4, a document base plate glass 502 is horizontally provided in a reader unit 501. The document base plate glass 502 acts as both the surface flow scanning glass 120 and the document base plate glass 118 of the first embodiment. A jump platform 503 is provided at left end of the document base plate glass 502 to grasp the document.

Referring to FIG. 4, in a document conveyance unit 601, a sheet feeding roller 603 and a separation roller 604 feed the document S placed on a sheet tray 602 while separating the document S one by one. The fed document S is conveyed onto a flow scanning portion 502a of the document base plate glass 502 by first to third conveyance rollers 605 to 607 which are of the document feeding device, and the document S is discharged on a discharge tray 609 by a discharge roller 608. The sheet tray 602 is provided below the discharge tray 609, and the sheet tray 602 is located lower than the sheet tray 202 of the first embodiment. Therefore, a user can easily place the document on the sheet tray 602. The document S passing by the flow scanning portion 502a is scraped by the jump platform 503 and guided to the conveyance roller 607.

A first reading unit 604a and a second reading unit 604b are disposed between the second conveyance roller 606 and the third conveyance roller 607. The surface and backside images of the document conveyed onto the flow scanning portion 602a are read by the first reading unit 604a and the second reading unit 604b respectively. The first reading unit 604a has the same configuration as the first reading unit 301 of the second embodiment, and the first reading unit 604a is provided in the reader unit 501. The second reading unit 604b has the same configuration as the second reading unit 401 of the second embodiment, and the second reading unit 604b is provided in the document conveyance unit 601. The first reading unit 504a is scanning-moved to read the document image placed on a document placing portion 502b of the document base plate glass 502.

The first reading unit 604a and the second reading unit 604b are provided so as to read the document front side and the document backside which are horizontally conveyed on the flow scanning portion 502a by the conveyance rollers 606 and 607. When the first reading unit 604a and the second reading unit 604b read the horizontally-conveyed document, the document is read while a conveyance resistance of the document is in the minimum state, so that the image deterioration caused by the fluctuation in document conveyance speed or the vibration of the document can be prevented. Additionally, because the first and second reading units are provided between the pair of conveyance rollers, the first surface and second surface of the document becomes identical in the reading speed, so that reading scanning magnifications of the first surface and second surface can be caused to coincide with each other.

A first imaging unit 610 is provided in the first reading unit 604a and a second imaging unit 611 is provided in the second reading unit 604b. The vertical directions of the first imaging unit 610 and second imaging unit 611 become identical while the incident side of the light beam to the imaging unit is located below the outgoing side.

The configuration of FIG. 4 differs from that of the first embodiment in that the off-axial imaging units possessed by the reader unit and document conveyance unit are disposed while becoming identical in both the vertical direction and the horizontal direction. Even in the configuration of FIG. 4, the orientations of the gravity acting on the off-axial imaging units provided in the reader unit and document conveyance unit can be caused to coincide with each other. Therefore, the generation of the difference in imaging performance caused by the difference in deformation of the mirrors constituting the off-axial imaging unit due to the gravity can be eliminated, and the difference in reading image between the document front side and the document backside caused by the deformation in off-axial reflecting surface can be decreased.

The imaging units are provided such that the incident and outgoing directions of the light beam with respect to each imaging unit become identical in the horizontal direction, so that the orientations of the imaging units in the document conveyance direction can become identical in the reader unit and the document conveyance unit. Therefore, the reader unit is identical to the document conveyance unit in the plural-line reading order when the document is imaged on CCD having the plural lines (for example, RGB three-color lines) by the off-axial imaging unit. Accordingly, the difference in image between the document front side and the document backside can further be decreased without reversely attaching CCDs to reader unit and the document conveyance unit or performing the electric processing.

Other Embodiments

In the above embodiments, the so-called scanner having the reader unit and document conveyance unit is illustrated as the image reading apparatus. However, the invention is not limited to the scanner. For example, the invention may be applied to the image reading apparatus in the copying machine and the facsimile or the image reading apparatus in a multi function peripheral in which these functions are combined. In such cases, the same effects can be obtained by applying the invention to the image reading apparatus.

Although the off-axial imaging unit having the four imaging mirrors is illustrated in the above embodiments, the number of mirrors is not limited to four. Other configurations may be adopted as long as the off-axial imaging unit including the plural imaging mirrors, in which the off-axial reflecting surfaces having the curvatures are formed while the incident and outgoing directions of the reference axis light beam are different from each other, is used.

Figure 5:
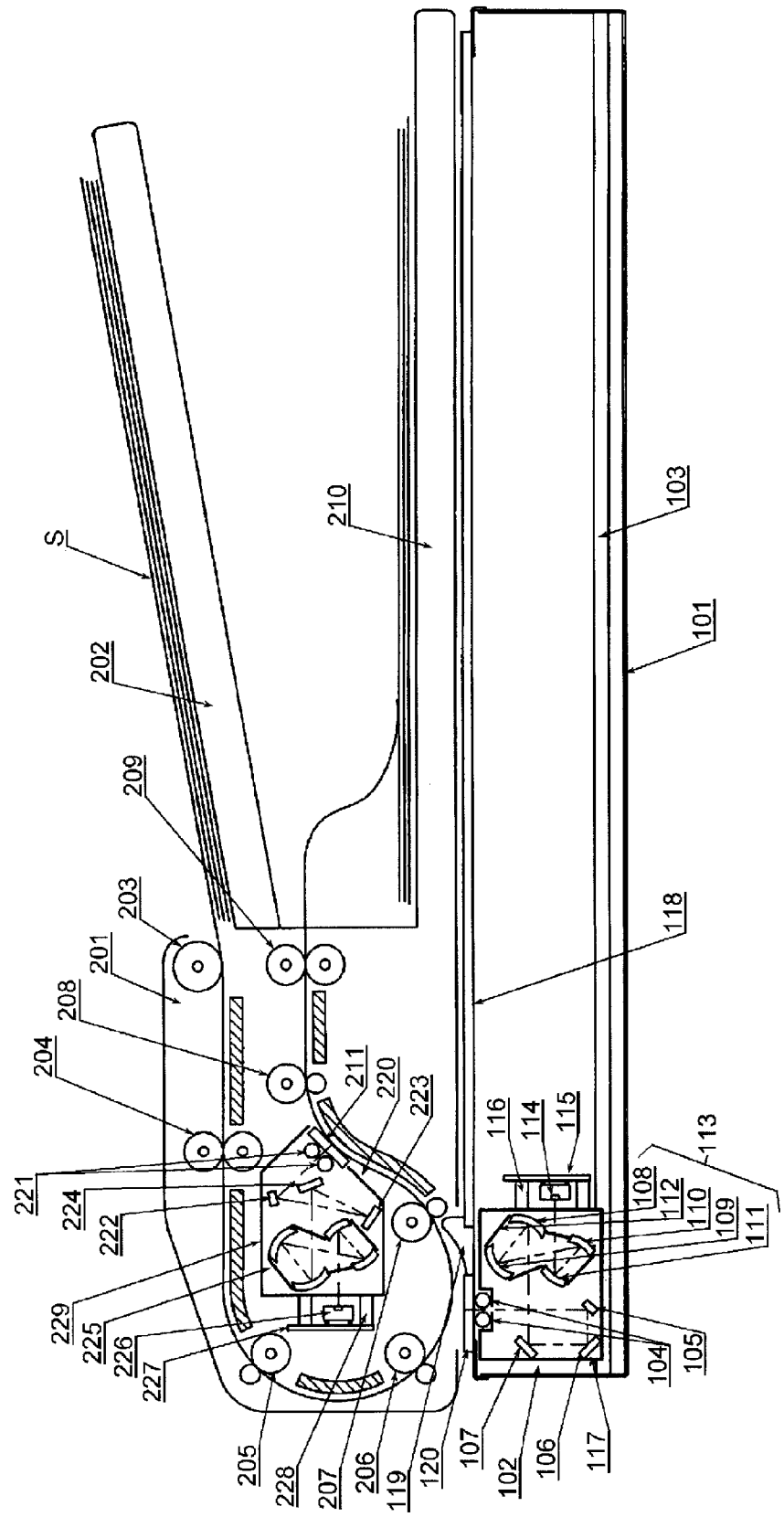
FIG. 5 is a sectional view showing a schematic configuration of an image forming apparatus according to other embodiments of the invention.

Although the imaging unit in which the incident side of the reference axis light beam to the off-axial imaging unit is located below the outgoing side is illustrated in the above embodiments, the vertical relationship between the incident side and the outgoing side is not limited to the above embodiments. As shown in FIG. 5, even if the incident side of the reference axis light beam to the off-axial imaging unit is located above the outgoing side, the effects of the invention can be obtained when the first reading device which reads one surface of the document and the second reading device which reads the other surface are provided such that the vertical directions of the first reading device and second reading device become identical.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of priority from the prior Japanese Patent Application No. 2006-312808 filed on Nov. 20, 2006 the entire contents of which are incorporated by reference herein.

What is claimed is:

1. An image reading apparatus comprising:
a first reading device which includes a first imaging unit and a first light receiving sensor, the first imaging unit for imaging light reflected from a first image surface of a document on to the first light receiving sensor, the first light receiving sensor for performing a photoelectric conversion of the imaged light by the first imaging unit; and
a second reading device which includes a second imaging unit and a second light receiving sensor, the second imaging unit for imaging light reflected from a second image surface of the document on to the second light receiving sensor, the second light receiving sensor for performing a photoelectric conversion of the imaged light by the second imaging unit,
wherein the first imaging unit and the second imaging unit include an off-axial reflecting surface having a curvature, and
wherein an incident direction of a reference axis light beam differs from an outgoing direction of the reference axis light beam in the first imaging unit and the second imaging unit; and
wherein the first imaging unit and the second imaging unit are respectively disposed in the first reading device and the second reading device so that an incident position is located below an outgoing position.

2. The image reading apparatus according to claim 1, wherein each of the first reading device and second reading device includes:
the respective one of the first imaging unit or the second imaging unit;
the respective one of the first light receiving sensor or the second sensor;
a light source which irradiates the document;
a reflecting mirror which guides the light reflected from the document to the imaging unit; and
a reading device frame which integrally retains the first imaging unit or second imaging unit, the first light receiving sensor or the second light receiving sensor, the light source, and the reflecting mirror.

3. The image reading apparatus according to claim 2, wherein the reading device frames included in the first and second reading devices are the same.

4. The image reading apparatus according to claim 2, wherein in the first reading device, reflection light downward from the first image surface of the document is led in the incident direction of the first imaging unit by the reflecting mirror, and wherein in the second reading device, reflection light upward from the second image surface of the document is led in the incident direction of the first imaging unit by the reflecting mirror.

5. The image reading apparatus according to claim 1, wherein the first imaging unit and the second imaging unit are respectively disposed in the first reading device and second reading device such that the incident direction and the outgoing direction of the reference axis light beam are reversed to each other in a horizontal direction.

6. The image reading apparatus according to claim 1, wherein the first imaging unit and the second imaging unit are respectively disposed in the first reading device and the second reading device such that the incident direction and the outgoing direction of the reference axis light beam become identical in a horizontal direction.

7. The image reading apparatus according to claim 1, further comprising a document feeding device having a plurality of conveyance rollers, and the first and second reading devices are provided between the conveyance rollers.

8. The image reading apparatus according to claim 1, further comprising a document base plate on which the document is positioned and a document feeding device for conveying the document to the base plate;

wherein the first reading device is constructed to read the first image surface of the document while being moved along the document base plate; and wherein the second reading device is constructed to read the second image surface of the document while the document is conveyed by the document feeding device.

9. The image reading apparatus according to claim 8, wherein in the first reading device, reflection light downward from the first image surface of the document is led in the incident direction of the first imaging unit by the reflecting mirror, and wherein in the second reading device, reflection light upward from the second image surface of the document is led in the incident direction of the first imaging unit by the reflecting mirror.

10. The image reading apparatus according to claim 1, further comprising a document feeding device for conveying the document;

wherein both of the first reading device and the second reading device are constructed to read the respective first and second image surfaces of the document while the document is being conveyed by the document feeding device.

11. An image reading apparatus comprising a first reading device which includes a first imaging unit and a first light receiving sensor, the first imaging unit for imaging light reflected from a first image surface of a document onto the first light receiving sensor, the first light receiving sensor for performing a photoelectric conversion of the imaged light by the first imaging unit; and a second reading device which includes a second imaging unit and a second light receiving sensor, the second imaging unit for imaging light reflected from a second image surface of the document onto the second light receiving sensor, the second light receiving sensor for performing a photoelectric conversion of the imaged light by the second imaging unit, wherein the first imaging unit and the second imaging unit include an off-axial reflecting surface having curvature, and wherein an incident direction of a reference axis light beam differs from an outgoing direction of the reference axis light beam in the first imaging unit and the second imaging unit; and wherein the first imaging unit and the second imaging unit are respectively disposed in the first reading device and the second reading device so that an incident position is located above an outgoing position.

12. The image reading apparatus according to claim 11, wherein each of the first reading device and the second reading device includes:

the respective one of the first imaging unit or the second imaging unit;

the respective one of the first light receiving sensor or the second light receiving sensor;

a light source which irradiates the document;

a reflecting mirror which guides the light reflected from the document to the imaging unit; and a reading device frame which integrally retains the first imaging unit or second imaging unit, the first light receiving sensor or the second light receiving sensor, the light source, and the reflecting mirror.

13. The image reading apparatus according to claim 12, wherein the reading device frames included in the first and second reading devices are the same.

14. The image reading apparatus according to claim 11, wherein the first imaging unit and the second imaging unit are respectively disposed in the first reading device and the second reading device such that the incident direction and outgoing direction of the reference axis light beam are reversed to each other in a horizontal direction.

15. The image reading apparatus according to claim 11, wherein the first imaging unit and the second imaging unit are respectively disposed in the first reading device and the second reading device such that the incident direction and the outgoing direction of the reference axis light beam become identical in a horizontal direction.

16. The image reading apparatus according to claim 11, further comprising a document feeding device having a plurality of conveyance rollers, and the first and second reading devices are provided between the conveyance rollers.

17. The image reading apparatus according to claim 11, further comprising a document base plate on which the document is positioned and a document feeding device for conveying the document to the base plate;

wherein the first reading device is constructed to read the first image surface of the document while being moved along the document base plate; and wherein the second reading device is constructed to read the second image surface of the document while the document is conveyed by the document feeding device.

18. The image reading apparatus according to claim 11, further comprising a document feeding device for conveying the document;

wherein both of the first reading device and the second reading device are constructed to read the respective first and second image surfaces of the document while the document is being conveyed by the document feeding device.

* * * * *